(12) United States Patent
Sinn

(10) Patent No.: US 6,234,371 B1
(45) Date of Patent: May 22, 2001

(54) LUGGAGE BOX FOR MOTOR VEHICLES

(75) Inventor: Jul Sinn, Merano (IT)

(73) Assignee: Sinnova SRL, Merano (IT)

( * ) Notice: Subject to any disclaimer, the term of this patent is extended or adjusted under 35 U.S.C. 154(b) by 0 days.

(21) Appl. No.: 09/242,970

(22) PCT Filed: Jun. 18, 1998

(86) PCT No.: PCT/EP98/03676

§ 371 Date: Feb. 24, 1999

§ 102(e) Date: Feb. 24, 1999

(87) PCT Pub. No.: WO99/00274

PCT Pub. Date: Jan. 7, 1999

(30) Foreign Application Priority Data

Jun. 25, 1997 (IT) .......................... BZ97A000037

(51) Int. Cl.[7] .................. B60P 3/367; B60R 9/055; B60R 9/058
(52) U.S. Cl. .................. 224/328; 114/361; 224/315; 224/486; 296/157
(58) Field of Search .................. 224/328, 486, 224/282, 485, 484, 309, 310, 315, 316, 324, 325, 326, 327, 330; 114/343, 352, 361; 296/157

(56) References Cited

U.S. PATENT DOCUMENTS

| | | | |
|---|---|---|---|
| 2,684,796 | * 7/1954 | Swenson | 224/328 |
| 3,684,139 | * 8/1972 | Johnson | 224/486 |
| 4,052,761 | * 10/1977 | Rilling | 114/352 |
| 4,794,876 | * 1/1989 | Levine | 224/328 |
| 5,645,010 | * 7/1997 | Lundstrom | 114/352 |
| 5,791,280 | * 8/1998 | Egan et al. | 114/343 |
| 5,819,682 | * 10/1998 | Pestel | 114/345 |

FOREIGN PATENT DOCUMENTS

| | | | |
|---|---|---|---|
| 1933493 | 2/1966 | (DE) . | |
| 2048462 | 4/1972 | (DE) . | |
| 3802574 | 8/1989 | (DE) . | |
| 2642025 | 7/1990 | (FR) . | |
| 2666285 | 3/1992 | (FR) . | |
| 2 272 426 | * 5/1994 | (GB) | 224/328 |
| 9514590 | 6/1995 | (WO) . | |

* cited by examiner

Primary Examiner—Allan N. Shoap
Assistant Examiner—Niki M. Eloshway
(74) Attorney, Agent, or Firm—Horst M. Kasper

(57) ABSTRACT

A luggage box has a rigid bottom shell (2) that can be secured on transverse supporting posts (4) and a top shell (4) that can be swivelled open (4c), removed from the bottom shell and used as a boat. The luggage is secured by a covering canvas or shell (3) which can be entirely or partially removed from the bottom shell (2) or is provided with closable openings. The bottom shell (2) has at its bottom side a separately accessible storage space (2) whose flap (2h) further allows access to a lateral storage space (2c) and to a possible actuating element for the hooking system (7, 8, 9, 10) between the bottom shell (2) and the boat (4).

33 Claims, 2 Drawing Sheets

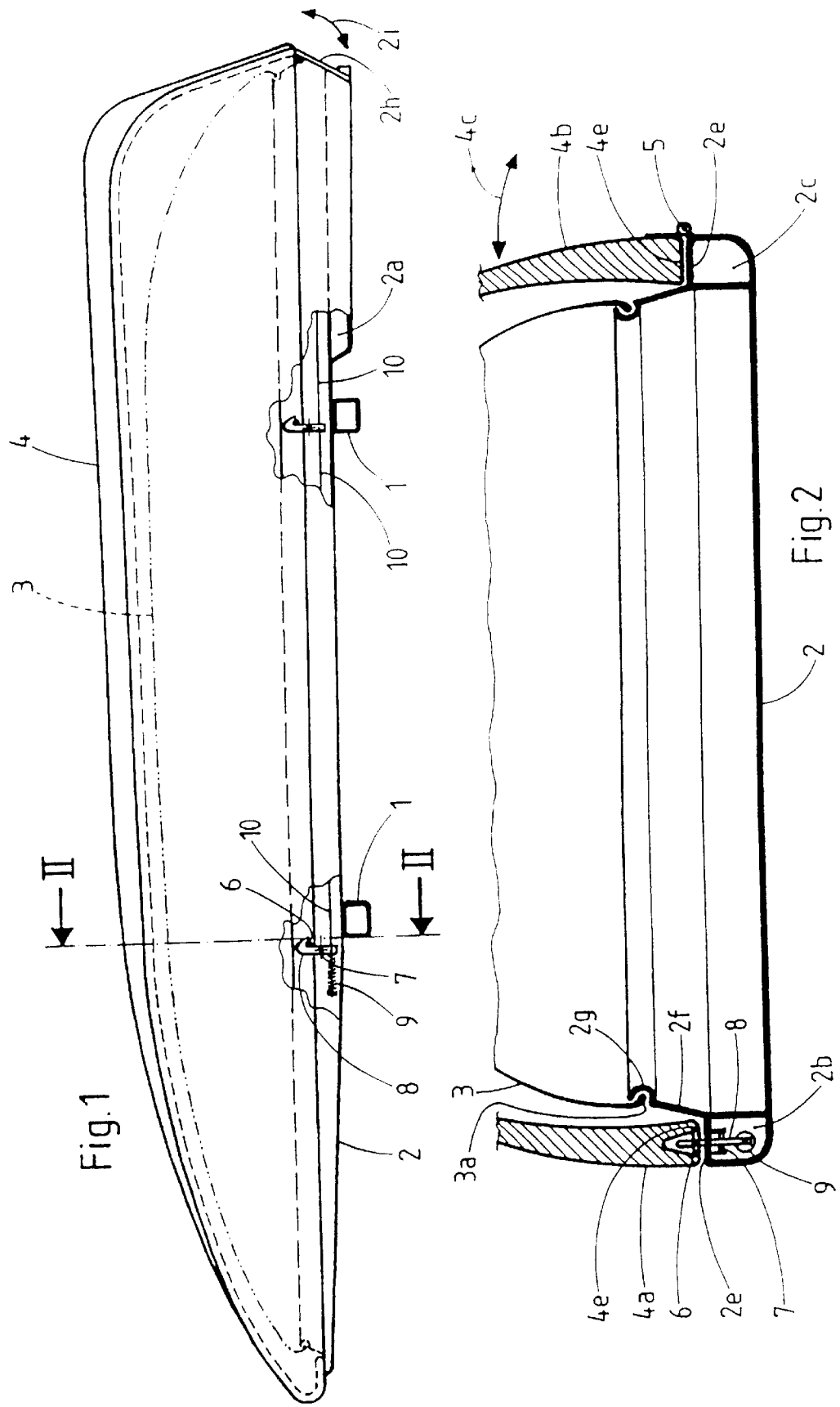

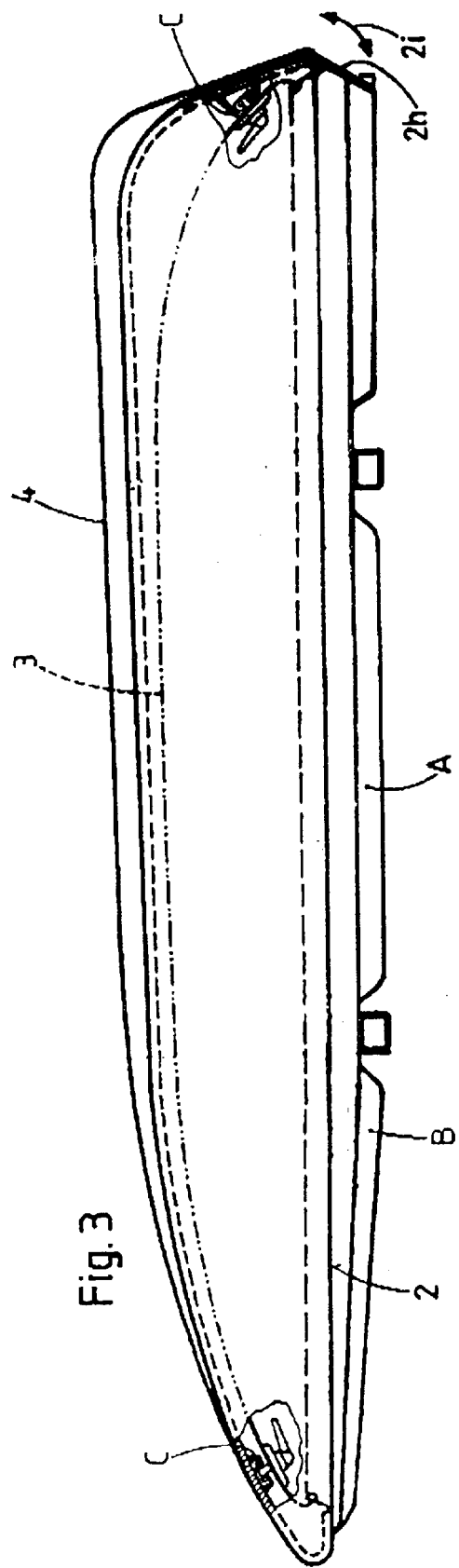

LUGGAGE BOX FOR MOTOR VEHICLES

DESCRIPTION

The invention relates to a luggage box to be attached to or in part inserted into a motor vehicle roof, a recreational vehicle roof, or a trailer roof for the stowing or storage of luggage, sports equipment and/or camping gear or the like which cannot be stored in the interior or in the trunk of the vehicle. Various such containers are known, for example from the German printed patent document DE-O-3,910,952 and from the German printed patent document DE 3,935,944. These containers are dimensioned such that they can accommodate at least two pairs of skis, wherein the outer shape of these containers is preferably at the same time designed to be aerodynamic. In addition, it is known to use the depth of the bottom shell of such boxes in the region between the support posts of the roof rack for the storing of additional luggage items, for example of ski boots.

In order to lower the manufacturing costs, it is known to employ shells which are symmetrical relative to the longitudinal axis as well as relative to a transverse axis. It is further known to employ the shells of such luggage boxes for other purposes, such as for example as parts of a catamaran (DE-)-3,920,951) or, by lifting one of the shells as a sleep bunk or cot or, respectively, as a boat (DE-O-2, 539,093).

It is known from the German printed patent document DE 2,048,462 A that, in case of a luggage box, the boat which serves as cover grips with its edge over the laterally projecting circumferential edge of the bottom shell in order to prevent a penetration of rain water into the interior of the box.

All these multiple uses of the shells of the luggage box are accompanied by the disadvantage that the content has to be stored in a different way for the entire duration of the alternative use of the shells, which can lead to inconveniences during the use of the (overloaded) vehicle or, respectively, of the tent and/or of the trailer. These inconveniences often last for the larger part of the holidays, with the exception of the times for the journey there and the journey back and the possible intermediate trips including the complete equipment.

It is the object of the invention to provide for a luggage box of the initially recited kind, wherein the outer cover shell of the luggage box consists of a boat, wherein the (alternative) use of the boat does not require the repacking or restacking of the contents such that the contents remains protected against dust, rain and wind and is secured against theft, wherein the motor vehicle can also be used without mounting or placement of this outer cover shell. In addition, it is the object of the invention to provide for separate compartments with separate access openings for often-used objects and devices, (for example ladder, stool as climbing aid) for the loading and unloading of the luggage box or, respectively, for the mounting or demounting of the boat and/or for the erection of the tent, etc.

This object is solved according to the invention in that a rather flat bottom shell is provided with a possibly enlarged support edge for the boat and with an upwardly projecting collar having a hollow groove for the purpose of attaching a tarpaulin or an inner (stiff) covering shell, wherein access to the luggage is possible through openings with zipper closure or sliding covers or, respectively, hinged panels and/or opening areas between the tarpaulin or the cover shell and the upwardly projecting collar of the bottom shell. In the case of a stiff, inner, sealed covering shell, this cover can preferably be swiveled upwardly in that hinge mountings are provided at one of the longitudinal edges.

The boat is also hinge-like attached at one of the longitudinal edges and can be swivelled upwardly and detached while mounting elements are provided at the other edge, wherein hooks or corresponding snap-in elements, provided at the edge of the bottom shell of the luggage box, engage into said mounting elements. These hooks or snap-in elements are preferably of the kind which automatically snap in upon closing the outer cover shell (boat), while a lever is provided for the unlocking, wherein the therewith mechanically connected hooks are actuated with a cable pull in that the force of a tension spring is overcome. This lever is preferably provided with a lock or is disposed at the rear side of the lower separate storage space below the flap or hinged cover provided with a closure, wherein the separate storage space is provided in the rear region of the bottom shell and is suitable for the storage of often used accessories or of devices which facilitate the access to the luggage, for example ladder, boat accessories, camping accessories, tools, etc. The bottom shell of the luggage box according to the invention is substantially stiffened and reinforced by the upwardly projecting collar for the attachment of the tarpaulin or of the inner covering shell; an additional stiffening and reinforcement is possibly provided by two longitudinal hollow spaces, wherein mounting elements with their actuation mechanisms are disposed on one side of said hollow spaces while the possible hinge elements for the inner covering shell and/or for the outer cover shell, usable as boat, are provided on the opposite side.

These hinge elements can be of various kinds and comprise preferably a part, anchored at the edge of the bottom shell of the luggage box, while the second part is anchored at the corresponding edge of the boat or is also connected to the bottom shell and is insertable into the edge of the boat. It is conceivable that similar hinges as used for side walls at loading surfaces of trucks are employed, wherein the pin cones are attached at the bottom shell and the band, which is demountable at a specific angle, is attached at the edge of the boat. In the case of a hinge connection with a pivoting axis, disposed at the inside relative to the edge of the boat, the employment of hinges, as employed mainly in the furniture field, is advantageous.

The boat can of course have different shapes and the mounting elements and/or the hinge parts can simultaneously be used as attachment elements for accessories if used as a boat. The invention provides in addition that the inner stiff covering shell is provided at the outer surface with mountings or holders and/or recesses for the storing of accessories and/or of equipment objects for sports or tourism. The boat can be provided with a drive motor and with possibly foldable accessories in case of a corresponding formation of the inner covering shell or cover tarpaulin, wherein the drive motor and foldable accessories find space between the intermediate chamber between the inner covering shell or cover tarpaulin and the boat, in order to offer the user a boat which is ready for use and is already equipped with accessories, possibly including a drive motor.

The boat exhibits preferably a suitable cross-section such that the boat can serve as a container when it is not attached to the bottom shell; in this case the bottom shell can be employed as a container cover.

According to the invention, the inner covering shell can be hinged at the bottom shell to be laterally folded and swung open and can be locked in the closed state. In this case, the boat, placed in an inverted position over the cover shell, is attached at the cover shell and can be swivelled open together with the cover shell. In this case, the attachment elements between the cover shell and the boat are only accessible in the swung-open position. It is advantageous to provide for buckles in the front and in the back between the bottom shell and the boat, wherein the buckles can engage both at the outside at the edge of the boat and also at the outer edge of the shell in order to additionally secure the closure position of the outer shell or, respectively, of the boat.

A cover shell with a rather flat, low form can be offered in particular for the use of a luggage box, for example in the winter and without boat. This cover shell can exhibit attachment elements at the outside which allow to securely attach luggage to the attachment element of the cover shell in the summer when the boat is used such that the luggage occupies the storage space between the cover shell and the boat.

According to the invention, the bottom shell can also exhibit compartments in the region between the transverse support posts of the roof rack or/and in the front region, which compartments are accessible individually, possibly from the outside (laterally) (FIG. 3).

Seats are preferably provided in the boat which comprise a tarpaulin or a tarred canvas which is attached to a stiff back rest, insertable laterally in the inner wall of the boat and to a likewise insertable pipe. Both the back rest and the pipe can be placed in different positions in order to offer different seating positions and seating arrangements. In particular, boat accessories can be space-savingly stored and secured in corresponding recesses at the inner wall of the boat.

Anchoring rails for the attachment and application of additional, possibly inflatable float bodies (floats) and/or of wheels for the easier transportation on ground can be provided at the outer wall of the boat. Such anchoring rails or anchoring grooves and/or attachment elements can also be provided at the flat of the stern of the boat. The invention provides in addition that the bottom shell of the luggage box can also be recessed into the roof, for example of a recreational vehicle or of a trailer. In this case, the overall height of the construction is limited and it is offered as advantageous that the storage compartments of the bottom shell be accessible from the inside of the trailer or, respectively, of the recreational vehicle.

The invention is explained in the following in detail based on two preferred exemplified embodiments of a luggage box according to the invention, illustrated schematically in the attached drawings, wherein the drawing serves a purely explanatory but non-limiting purpose.

FIG. 1 shows a side view of a luggage box according to the invention with two transverse support posts for the roof attachment, with a separate storage space, which is provided in the rear region of the bottom shell and with the inner covering shell or cover tarpaulin, which is shown by a dash-dot-dot line. In order to show the mounting system between the boat and the bottom shell of the luggage box, the respective regions are shown in a sectional view.

FIG. 2 shows a partially cross-sectional view along section line II—II through the luggage box shown in FIG. 2 in an enlarged scale.

FIG. 3 shows a longitudinal sectional view of a luggage box according to the invention, wherein the attachment of the boat at the covering cap is performed with a lock or catch C. In this case, only the cover shell is connected with the hinges to the bottom shell and the insertion hooks act on the edge of the cover shell.

The luggage box according to the invention comprises essentially a stiff bottom shell 2 which can be attached in a known manner to two transverse support posts 1 of a roof rack of various constructions, an inner covering shell or covering tarpaulin 3 and an outer cover shell 4 which can be used as a boat. The stiff bottom shell 2 exhibits a circumferential edge 2e, which is possibly enlarged or expanded and/or provided with a seal corresponding to the edge 4e of the boat shell 4. Automatic insertion elements are provided at one of the longitudinal sides of the edge 2e of the bottom shell 2, wherein the insertion elements are comprised of two interconnected hooks 8, supported by bolts 7, wherein the hooks 8 are connected with a cable 10 to an actuation lever and are loaded by a spring 9, which spring 9 acts in insertion direction. These insertion elements 8 act on pins 6, which pins 6 are provided in a corresponding position at the edge 4e of the boat shell 4. The stiffening of the bottom shell 2 and its shape stability is achieved with the inner, upwardly projecting collar 2f, which collar 2f preferably is a groove 2g for the attachment of the covering tarpaulin 3 or, respectively, serves for the attachment of an inner covering shell. The lateral hollow spaces 2b, 2c which extend over the major portion of the longitudinal edges of the bottom shell 2 are suitable on one side for the attachment of the insertion elements 8, 9, 10 and on the opposite side for the attachment of the hinge connections 5.

These hinge connections 5 are of the demountable kind such that either a swiveling motion 4c between the bottom shell 2 and the boat 4 or also the demounting between the hinge part, attached at the bottom shell 2, and the corresponding second hinge part, which is attached at the side edge 4b of the boat, is possible. The invention does not exclude the use of swivel hinges with an inside swivelling axis, as they are known in the furniture field. In addition, the use of simple bands is possible which, when introduced at a specific position behind projections, allow the swivelling 4c of the boat and permit the demounting only in a specific swivelling position.

A separate storage space 2a is provided at the under side in the rear region of the bottom shell 2, which storage space 2a is accessible through a swivellable 2i flap or hinged cover 2h provided with a lock. Tools and/or often used equipment can be stowed in this storage space 2a, such as for example a foldable ladder to facilitate the access into the luggage box or, respectively, for mounting and demounting the boat 4. Preferably, the actuation lever for the hook 8 is also disposed below this flap or hinged cover 2h. The lateral hollow space 2c can also be made accessible by opening the flap or hinged cover 2h and can be employed for storing long tubular elements which are often employed as camping and/or boating accessories. In particular, the covering tarpaulin 3, or in its place the inner covering shell, allows the use of the vehicle with the luggage pieces totally or in part packed into the luggage box according to the invention, wherein the luggage box is not provided with the boat, and wherein the luggage is covered and protected against dust and rain. In addition, all luggage pieces can remain orderly in the box and are accessible through zippers or through other access openings, possibly secured by locks against theft.

What is claimed is:

1. A luggage box comprising a stiff bottom shell (2), which is attached at two transverse support posts (4), and an outer cover shell (4), which cover shell (4) can be employed as boat and is swivellable (4c) and can be demounted from the bottom shell (2), an inner stiff covering shell or a covering tarpaulin (3) is disposed circumferentially in an inward region relative to the edge (4e) of the outer cover shell (4) and is attached at the bottom shell in a detachable way or in a partially open-swivellable way, and wherein this inner covering shell or covering tarpaulin (3) is secured in closure position with one or several locks.

2. The luggage box according to claim 1, wherein the inner stiff covering shell (3) can be swivelled open laterally and is closable and/or lockable at the bottom shell (2) in a closure position whereas the outer cover shell (4) in a position inverted over the inner covering shell (3) can be detachably locked or, respectively, attached from the inside at the inner covering shell (3) in the swivelled open position.

3. The luggage box according to claim 1 or 2, wherein the bottom shell (2) exhibits an upwardly extending circumferential collar (2f) in a circumferential region and at the inside relative to the edge region of the outer cover shell (4), wherein the upwardly extending circumferential collar (2f) projects from the bottom shell (2), wherein the collar (2f) exhibits along the upper edge (3a) a groove (2g) in the lower region or in intermediate positions for receiving the circumferential edge (3a) of the inner covering shell (3), for the attachment of fastening elements between the bottom shell and the inner covering shell and/or for the attachment of hinge elements or, respectively, mounting elements between the bottom shell and the inner covering shell.

4. The luggage box according to the claims 1 or 2, wherein the bottom shell (2) exhibits a circumferential support edge (2e) corresponding to a circumferential edge (4e) of at the outer cover shell (4), wherein the support edge (2e) is stiffened and reinforced with lateral storage spaces (2b, 2c), and that in at least one of these storage spaces (2b) there are the elements for automatic mounting (8) between the bottom shell (2) and the outer cover shell (4), together with elastic restoring elements (9) and actuation elements (10), achieve the simultaneous demounting through actuation of one single lever or handle, wherein the lever or handle is provided with a lock or is only accessible after the flap or hinged (2h) with the lock has been opened, and that a second storage space (2c) is suitable for receiving hinges which allow a swivelling (4c) of the outer cover shell (4) and the demounting and mounting of the outer cover shell at the bottom shell (2).

5. The luggage box according to claim 1 or 2, wherein a storage space (2a) is provided in the rear lower region of the bottom shell, which storage space (2a) extends over the entire length of the bottom shell, that this storage space is accessible through a rear flap or hinged cover (2h), provided with a lock, and that also a lateral longitudinal storage space (2c) is accessible through the same flap or hinged cover, and that an actuation element generating the unlocking between the bottom shell (2) and the cover shell (4) is accessible at the opposite side.

6. The luggage box according to claim 1 or 2, wherein storage spaces (A or, respectively, B in FIG. 3) are provided at the bottom shell (2) in the region between the transverse support posts (1) and/or in the front region, which storage spaces (A or, respectively, B) are accessible when the inner covering shell (3) is swivelled open and/or through lateral, closable access openings.

7. The luggage box according to claim 1 or 2, wherein the inner covering shell exhibits closable openings and that in this case the inner covering shell can be fixedly connected to the bottom shell or, respectively, that the inner covering shell can be fixedly connected to the bottom shell or can be an integral part of the bottom shell.

8. The luggage box according to claim 1 or 2, wherein the inner covering shell or the covering tarpaulin (3) have such a shape that an intermediate space is formed between the inner covering shell (3) and the outer cover shell (4), wherein foldable or tiltable boat accessories and/or the boat drive motor or, respectively, luggage find space within the intermediate space and that, the inner covering shell (3) is provided with mounting devices and/or recesses or, respectively, compartments for receiving equipment and accessories for sports, and camping.

9. The luggage box according to 1 or 2, wherein the outer cover shell (4) exhibits recesses for the attachment of boat accessories at the inside and/or is provided with anchoring grooves, anchoring profiles and/or attachments elements at the outer side or, respectively, at the stern for attaching accessory drive bodies, wheels, and/or other boating equipment, and that stiff back parts and/or pipes can be inserted at the inner sides of the boat wall in transverse direction and in different positions in order to allow different seating arrangements and seating positions with tarpaulins or tarred canvas spanned between the back parts and the pipes.

10. The luggage box according to claim 1 or 2, wherein the bottom shell (2) can be placed onto the roof of the vehicle.

11. A luggage box comprising
two support elements;
a stiff bottom shell (2), which is attached at the two support elements,
an outer cover shell (4), which outer cover shell (4) can be employed as a boat and is swivellable (4c) and can be demounted from the stiff bottom shell (2),
an inner covering shell disposed circumferentially in an inward region relative to an edge (4e) of the outer cover shell (4) and is attached at the stiff bottom shell in a detachable way or in a partially open-swivellable way, and a lock, wherein this inner covering shell is secured in closure position with the lock.

12. The luggage box according to claim 11, wherein the inner stiff covering shell (3) can be swivelled open laterally and is closable and/or lockable at the bottom shell (2) in a closure position whereas the outer cover shell (4) in a position inverted over the inner covering shell (3) can be detachably locked or, respectively, attached from the inside at the inner covering shell (3) in the swivelled open position.

13. The luggage box according to claim 11, wherein the stiff bottom shell (2) exhibits an upwardly extending circumferential collar (2f) in a circumferential region and at the inside relative to the edge region of the outer cover shell (4), wherein the upwardly extending circumferential collar (2f) projects from the bottom shell (2), wherein the collar (2f) exhibits along the upper edge (3a) a groove (2g) in the lower region or in intermediate positions for receiving the circumferential edge (3a) of the inner covering shell (3), for the attachment of fastening elements between the bottom shell and the inner covering shell and/or for the attachment of hinge elements or, respectively, mounting elements between the bottom shell and the inner covering shell.

14. The luggage box according to claim 11, wherein the stiff bottom shell (2) exhibits a circumferential support edge (2e) corresponding to the circumferential edge (4e) of at the outer cover shell (4), wherein the support edge (2e) is stiffened and reinforced over with lateral storage spaces (2b, 2c), and that in at least one of these storage spaces (2b) there are elements for automatic mounting (8) between the bottom shell (2) and the outer cover shell (4), together with elastic restoring elements (9) and actuation elements (10), achieve the simultaneous demounting through actuation of one single lever or handle, wherein the lever or handle is provided with a lock or is only accessible after a flap or hinged cover (2h) provided with the lock has been opened, and that possibly a second storage space (2c) is suitable for receiving hinges which allow a swivelling (4c) of the outer cover shell (4) and the demounting and mounting of the outer cover shell at the bottom shell (2).

15. The luggage box according to claim 11, wherein a storage space (2a) is provided in the rear lower region of the bottom shell, which storage space (2a) extends over the entire length of the bottom shell, that this storage space is accessible through a rear flap or hinged cover (2h), provided with a lock, and that also a lateral longitudinal storage space (2c) is accessible through the same flap or hinged cover, and that an actuation element generating the unlocking between the bottom shell (2) and the outer cover shell (4) is accessible at the opposite side.

16. The luggage box according to claim 11, wherein storage spaces (A or, respectively, B in FIG. 3) are provided at the bottom shell (2) in the region between the transverse support posts (1) and/or in the front region, which storage spaces (A or, respectively, B) are accessible when the inner covering shell (3) is swivelled open and/or through lateral, closable access openings.

17. The luggage box according to claim 11, wherein the inner covering shell exhibits closable openings and that in this case the covering tarpaulin can be fixedly connected to the bottom shell or, respectively, that the inner covering shell can be fixedly connected to the bottom shell or can be an integral part of the bottom shell.

18. The luggage box according to claim 11, wherein the covering shell or the covering tarpaulin (3) have such a shape that an intermediate space is formed between the inner covering shell (3) and the outer cover shell (4), wherein foldable or tiltable boat accessories and/or a boat drive motor or, respectively, luggage find space within the intermediate space and that, the inner covering shell (3) is provided with mounting devices and/or recesses or, respectively, compartments for receiving equipment and accessories for sports, and camping.

19. The luggage box according to claim 11, wherein the outer cover shell (4) exhibits recesses for the attachment of boat accessories at the inside and/or is provided with anchoring grooves, anchoring profiles and/or attachments elements at the outer side or, respectively, at the stern for attaching accessory drive bodies, wheels, and/or other boating equipment, and that stiff back parts and/or pipes can be inserted at the inner sides of the outer cover shell wall in transverse direction and in different positions in order to allow different seating arrangements and seating positions with tarpaulins or tarred canvas spanned between the back parts and the pipes.

20. The luggage box according to claim 11, wherein the bottom shell (2) can be placed onto the roof of the vehicle.

21. A luggage box comprising
a stiff bottom shell;
an outer cover shell constructed to be used as a boat and having an edge, swivelably connected to the stiff bottom shell, and demountable from the stiff bottom shell;
an inner covering shell disposed inwardly relative to the edge of the outer cover shell and openably attached at the stiff bottom shell; and
a lock engaging the stiff bottom shell and the inner covering shell, wherein the inner covering shell is securable in a closure position with the lock to the stiff bottom shell.

22. The luggage box according to claim 21, further comprising
two support elements, wherein the stiff bottom shell is attached to the two support elements.

23. The luggage box according to claim 21, further comprising
lateral hollow spaces extending over a major portion of longitudinal edges of the stiff bottom shell furnished on a first side of the stiff bottom shell;
insertion elements disposed in the lateral hollow spaces;
hinge connections attached in the lateral hollow spaces on a second side of the stiff bottom shell.

24. The luggage box according to claim 21, further comprising
a circumferential edge attached to the stiff bottom shell, wherein the circumferential edge is provided with a seal corresponding to an edge of the outer cover shell;
automatic insertion elements provided at one of the longitudinal sides of the circumferential edge of the stiff bottom shell, wherein the insertion elements include two interconnected hooks supported by bolts, wherein the hooks are connected with a cable to an actuation lever and are loaded by a spring, wherein the spring acts in an insertion direction.

25. The luggage box according to claim 21, further comprising
a separate storage space furnished at an under side in a rear region of the stiff bottom shell;
a swivellable flap disposed at the stiff bottom shell for accessing the separate storage space;
a second lock for securing the swivellable flap to the stiff bottom shell.

26. The luggage box according to claim 25, further comprising an actuation lever for a hook disposed below the swivellable flap, wherein a lateral hollow space is made accessible by opening the flap.

27. The luggage box according to claim 21, further comprising
hinge mountings attached to the stiff bottom shell and to the inner covering shell, wherein the inner covering shell is formed of a stiff material for allowing the inner covering shell to be swiveled upwardly.

28. The luggage box according to claim 21, further comprising
hinge means for hinging the inner covering shell to the stiff bottom shell, wherein the inner covering shell is laterally foldable and swingable open and lockable into a closed state;
attachment elements disposed on the inner covering shell for attaching the outer cover shell to the inner covering shell, wherein the outer cover shell is placed in an inverted position over the inner covering shell, and wherein the outer cover shell is swivelable open together with the inner covering shell, wherein the attachment elements disposed on the inner covering shell are only accessible in the swing-open position of the inner covering shell.

29. The luggage box according to claim 21, further comprising
an inner, upwardly projecting collar (2f) including a groove (2g) attached to the stiff bottom shell for an attachment of the inner covering shell and for stiffening of the stiff bottom shell and for enhancing shape stability of the stiff bottom shell.

30. The luggage box according to claim 21, further comprising
mountings or holders and/or recesses for the storing of accessories and/or of equipment objects for sports or tourism disposed at an outer surface of the inner covering shell;

a drive motor attachable to the outer cover shell;

foldable accessories attachable to the outer cover shell, wherein the inner covering shell is correspondingly formed, wherein the drive motor and foldable accessories find space in an intermediate chamber formed between the inner covering shell and the stiff outer shell for offering a boat to the user, wherein the boat is ready for use and is already furnished with a drive motor and foldable accessories.

31. The luggage box according to claim 21, further comprising attachment elements furnished on the outside of the inner covering shell, wherein the attachment elements allow to securely attach luggage to the attachment element of the inner covering shell at times when the stiff outer shell is used as a boat such that the luggage occupies the storage space between the inner covering shell and the stiff outer shell.

32. The luggage box according to claim 21, further comprising a surrounding support edge (4e) disposed at the stiff bottom shell;

a circulating collar (2f) formed at the surrounding support edge and disposed at the stiff bottom shell and exhibiting a groove (2g) for receiving a lower circulating edge (3a) of the inner covering shell (3) and for seating the edge (4e) of the flipped over outer cover shell (4);

hinges or hanging elements attached to the circulating collar (2f), wherein the hinges or hanging elements connect the stiff bottom shell (2) to the inner covering shell (3); wherein the stiff bottom shell (2) is incapable of being employed as a boat, and wherein the stiff bottom shell has attached both the inner covering shell (3) and the outer cover shell (4);

wherein the inner covering shell (3) is formed together with the stiff bottom shell (2) as a single piece or, respectively, the cover shell or cover plane (3) is non-disengageably or disengageably connected to the floor shell (2).

33. The luggage box according to claim 21, further comprising a storage area furnished between the inner covering shell (3) and the outer cover shell, wherein the outer cover shell is invertedly put on the inner covering shell (3), wherein the inner covering shell (3) exhibits bending recesses useful as a storage area;

closable openings furnished in the inner covering shell (3), wherein an access to the storage area is rendered possible through said closable openings, wherein the inner covering shell (3) is non-disengageable connected to the stiff bottom shell (2).

* * * * *